Sept. 22, 1964 J. W. HARRISON 3,149,611
ANIMAL WATERING NIPPLE AND BOTTLE CAP COMBINATION
Filed March 25, 1963

INVENTOR.
James W. Harrison
BY
Roland G. Goodman
Attorney

United States Patent Office 3,149,611
Patented Sept. 22, 1964

3,149,611
ANIMAL WATERING NIPPLE AND BOTTLE CAP COMBINATION
James W. Harrison, Markham, Ill., assignor to the United States of America as represented by the United States Atomic Energy Commission
Filed Mar. 25, 1963, Ser. No. 267,873
1 Claim. (Cl. 119—72.5)

This invention relates to equipment for watering laboratory animals. More specifically, the invention relates to equipment of this type that is cheap and easy to clean and to replace.

For years rubber-stoppered bottles have been used for small-animal watering. It is difficult to sterilize rubber which swells when exposed to steam and hot water. Moreover, such stoppers must be carefully seated by hand in the mouth of watering bottles to prevent leakage when inverted. Often an entire litter or a cage-full of mice is lost as a result of flooding from an accidentally dislodged stopper. Such losses are costly where such mishaps terminate experiments. Replacement of damaged and deteriorating rubber stoppers is a costly, time-consuming chore.

Many attempts have been made to manufacture watering nipples which meter out only the required amount of water on demand. Invariably the cost of such devices is prohibitive when the number required is in the hundreds or thousands. Furthermore, the mechanical action of such devices is easily impaired by damage in handling or by clogging deposits left by evaporating water.

The present invention permits the use of automated commercial bottle washing, sterilizing, filling and capping machinery with a reduction in hand labor to about 10 percent of that required for conventional rubber-stoppered bottle handling. Flooding due to dislodged stoppers has been eliminated. Replacement of deteriorating parts is essentially eliminated since the nipple itself is a rugged, low-cost device which lasts indefinitely and may be sterilized quickly and efficiently.

These advantages have been accomplished by the present invention according to which a disposable bottle cap and an easily cleaned hard reusable nipple inserted therethrough and having a radially wide collar overlying the bottle cap cooperate to make water available to a caged animal on demand.

Other advantages of the present invention will be apparent from the following description and the accompanying drawing in which.

Figure 1:
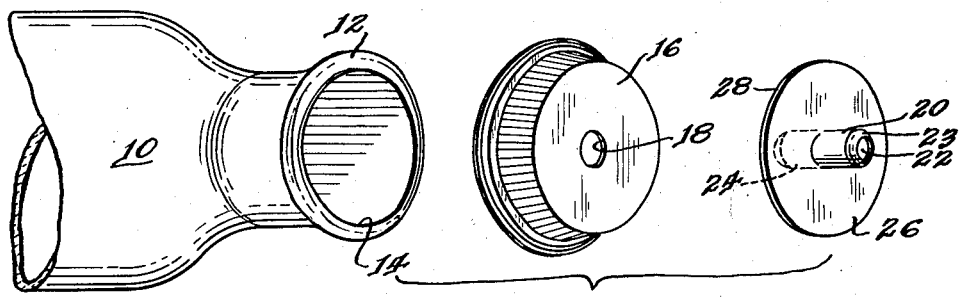
FIG. 1 is an exploded view of the watering device of the present invention.

A bottle 10 with a rim 12 defining a mouth 14 is provided with a cap 16 having a central hole 18 and made of plastic or cardboard coated on both sides with a plastic. The plastic in both forms of cap 16 may be polyethylene. The term "plastic" is used hereinafter to denote both forms of cap. A tubular nipple 20, which may be of stainless steel, has a reduced opening 22 in a forward end 23 and a bevelled opposite end 24 which is inserted into the hole 18 in the cap 16. The hole 18 is slightly smaller than the nipple 20 so that the cap 16 forms a snug leak-proof seal with the nipple on being elastically deformed by insertion of the nipple into the opening 18. Using stainless steel tubing with a 5/16" O.D. for the tubular nipple 20, I have found that a 9/32" diameter hole 18 in the cap 16 is adequate to form a seal which will not leak when the bottle 10 is inverted.

Figure 2:
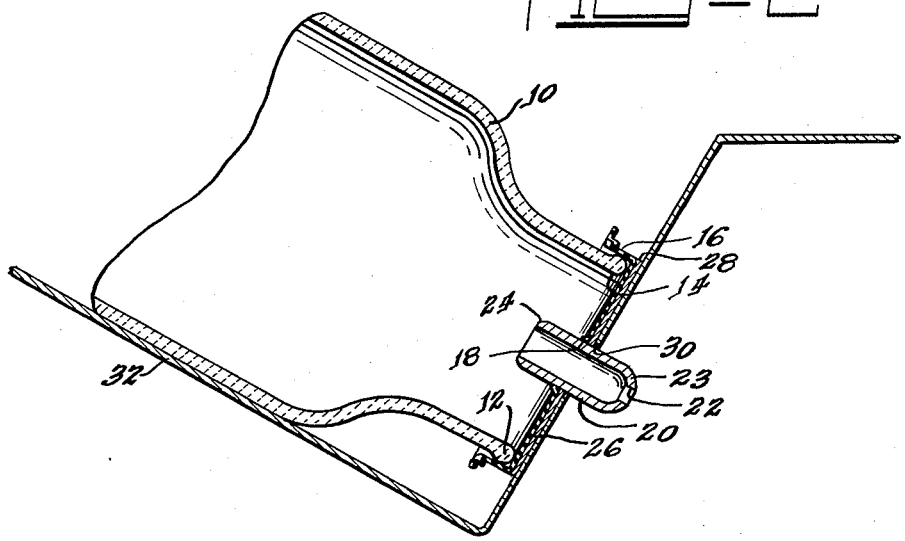
FIG. 2 is a sectional view showing the watering device installed in operating position in a cage rack.

A collar 26 is fastened by any convenient method such as press-fitting or welding to the tubular nipple 20 about midway between the two ends 23 and 24. I have found that it is important for a periphery 28 of the collar 26 to lie outward from the nipple 20 at least about as far as the rim 12 of the bottle 10. In this way the collar 26 is supported by the rim 12 which prevents tilting or longitudinal movement of the nipple 20 relative to the bottle 10 when the nipple is installed in a hole 30 in a cage rack 32 as shown in FIG. 2. A collar that does not extend out to about the rim of the bottle is not satisfactory, for then the associated nipple 20 can be moved longitudinally with respect to the bottle 10 particularly by a larger animal in a pumping action that may supply enough water to soak the animal's cage. When the collar 26 bears against rim 12, the nipple and cap combination are relatively rigid, and the animals are forced to be content to lick away the drops of water which form on the end of the nipple. If the collar 26 were of insufficient width that rocking or tilting of the nipple 20 might occur, such action could easily loosen the grip of the cap opening 18 on the nipple and cause leakage at the cap opening.

In practice, the collar 26 should extend radially outward as far as, or a little farther than, the portion of the cap 16 with which the collar lies in contact, so that after use, the nipple 20 and cap are easily disassembled by engagement of the periphery 28 of the collar and the outer portions of the cap 16 with the fingers.

When constructed according to the above description, the tubular nipple needs to be only about 5/8" long. This nipple and collar combination is easily sterilized and may be kept sterile until ready for installation in a cage rack. These nipple and collar combinations are relatively inexpensive and may be reused time after time since there are no parts subject either to mechanical damage or to deterioration in normal service.

The nipple 20 and its collar 26 should be corrosion-resistant, easily cleaned, temperature-resistant, and not readily deformed by chewing by animals being watered. Stainless steel is a good material for the nipple 20 and collar 26.

The bottle cap 16 is inexpensive when formed of polyethylene or polyethylene-coated cardboard. For sanitary reasons, the cap 16 is discarded after a single use. This reduces the volume of parts to be sterilized, handled and stored. New caps are readily fitted on freshly sterilized bottles filled with sterile water. All of these operations may be handled entirely by automatic machinery which is available in the dairy industry.

Although some bottle-washing machinery has been used by animal farms, automation has been impractical due to the necessity for hand labor in stoppering bottles. Bottles filled with sterile water could not be stored unstoppered for sanitary reasons. The present invention has made it possible to reduce labor costs to 10 percent, freeing animal caretakers of irksome work and enabling the same personnel to handle expanded facilities with increased numbers of animals.

The only bottling labor required is that necessary to load uncapped, used bottles into a washer where automatic machinery washes, sterilizes, fills and caps the bottles. Depending on the degree of automation, the capped bottles may be racked and stored temporarily by machine or hand loaded on carts for immediately delivery. This system makes it possible to maintain a sterile room for clean bottles separate from a nonsterile room where used bottles, cages, etc., are handled.

Another cost-wise advantage of the present invention is that it enables a laboratory to use standard milk bottles which are only a fraction of the price of the bottles normally used with rubber-stopper nipples.

It will be understood that the invention described herein may be modified within the scope of the appended claim.

What is claimed is:

An animal-watering device comprising: a disposable plastic cap adapted to be positioned over the mouth of a bottle so as to be sealed against a rim thereof, said cap being completely exterior to the bottle and having a flanged portion extending about the outer periphery of the rim, said cap having a central hole; a tubular nipple having one end reduced in size to form a nipple opening and having an opposite end bevelled for insertion into said hole in the cap, the sides of said hole engaging said tubular nipple in sealing relationship; and a collar attached to said tubular nipple and positioned about midway between the ends thereof, said collar having a periphery about coincident with the outer portions of the cap.

References Cited in the file of this patent
UNITED STATES PATENTS

| | | |
|---|---|---|
| 329,920 | Luedemann | Nov. 10, 1885 |
| 2,946,308 | Harris | July 26, 1960 |
| 2,953,170 | Bush | Sept. 20, 1960 |
| 3,002,492 | Naturale | Oct. 3, 1961 |